United States Patent [19]

Hara et al.

[11] Patent Number: 4,552,104
[45] Date of Patent: Nov. 12, 1985

[54] CRANKSHAFT OF V-6 INTERNAL COMBUSTION ENGINE

[75] Inventors: Kenjiro Hara, Yokohama; Haruya Shirose, Kawasaki, both of Japan

[73] Assignee: Nissan Motor Co., Ltd., Japan

[21] Appl. No.: 620,517

[22] Filed: Jun. 14, 1984

[30] Foreign Application Priority Data

Jun. 20, 1983 [JP] Japan .................................. 58-110412

[51] Int. Cl.⁴ ............................................. F16F 15/26
[52] U.S. Cl. .................................. 123/192 R; 74/603; 74/604
[58] Field of Search ............... 123/192 R, 192 B; 74/603, 604

[56] References Cited

U.S. PATENT DOCUMENTS

| | | | |
|---|---|---|---|
| 1,283,970 | 2/1918 | Thomas | 74/604 |
| 1,898,459 | 2/1933 | Newcomb | 123/192 B |
| 2,632,340 | 3/1953 | Dolza et al. | 74/603 |
| 3,166,054 | 1/1965 | Conover | 74/603 |

FOREIGN PATENT DOCUMENTS

55-131516 10/1980 Japan .
2092235 8/1982 United Kingdom ............... 74/603

Primary Examiner—Ira S. Lazarus
Assistant Examiner—R. S. Bailey
Attorney, Agent, or Firm—Leydig, Voit & Mayer

[57] ABSTRACT

A crankshaft of a V-6 internal combustion engine is provided with first and second end balance weights located at the front and rear end sections thereof. The crankshaft is further provided with first and second middle balance weights located near the first and second end balance weight, respectively, and a central balance weight located at the central section thereof, thereby establishing dynamic balance even between the adjacent main bearing journals of the crankshaft.

3 Claims, 20 Drawing Figures

CRANKSHAFT OF V-6 INTERNAL COMBUSTION ENGINE

BACKGROUND OF THE INVENTION

1. Field of the Invention

This invention relates in general to a crankshaft of a V-6 internal combustion engine, and more particularly to an improvement in the crankshaft which has four main bearing journals at which the crankshaft is rotatably supported.

2. Description of the Prior Art

In connection with crankshafts used in V-6 internal combustion engines, it is known that a crankshaft is formed with a plurality of main bearing journals which are rotatably supported through main bearings on a cylinder block. Additionally, the crankshaft is provided with two balance weights which are located at front and rear end sections thereof, so that dynamic balance can be established in the crankshaft as a whole.

However, no dynamic balance is established between adjacent main bearing journals and therefore the bearing load at the main bearing journals increases. This raises problems of wear and seizure of bearings and noise generation due to eccentric bearing wear.

SUMMARY OF THE INVENTION

The crankshaft of the present invention comprises first, second, third, and fourth main bearing journals which are disposed successively in an order direction from a front end to a rear end of the crankshaft. First and second crank pins are disposed successively in the order direction and between the first and second main bearing journals. Third and fourth crank pins are disposed successively in order direction and between the second and third main bearing journals. Fifth and sixth crank pins are disposed successively in the order direction and between the third and fourth main bearing journals. The adjacent ones of the main bearing journals and crank pins are connected with each other by each crank arm. The crank arm connecting the first main bearing journal and the first crank pin is provided with a first end balance weight, while the crank arm connecting the sixth crank pin and the fourth main bearing journal is provided with a second end balance weight.

Additionally, the crank arm connecting the first and second crank pins is provided with a first middle balance weight which is located generally on the opposite side of a crankshaft center axis from the first and second crank pins, while the crank arm connecting the fifth and sixth crank pins is provided with a second middle balance weight which is located generally on the opposite side of the crankshaft center axis from the fifth and sixth crank pins. The crank arm connecting the third and fourth crank pins is provided with a central balance weight which is located generally on the opposite side of the crankshaft center axis from the third and fourth crank pins.

By virtue of the first and second middle balance weights and the central balance weight, dynamic balance can be established not only in the crankshaft as a whole but also between the adjacent main bearing journals, particularly the second and third main bearing journals, of the crankshaft, thereby effectively preventing wear and seizure of bearings and noise generation due to eccentric wear of the bearings.

BRIEF DESCRIPTION OF DRAWINGS

The features and advantages of the crankshaft of the present invention will be more clearly appreciated from the following description taken in conjunction with the accompanying drawings in which like reference numerals designate corresponding parts and elements, and in which.

DETAILED DESCRIPTION OF THE INVENTION

Figure 1:
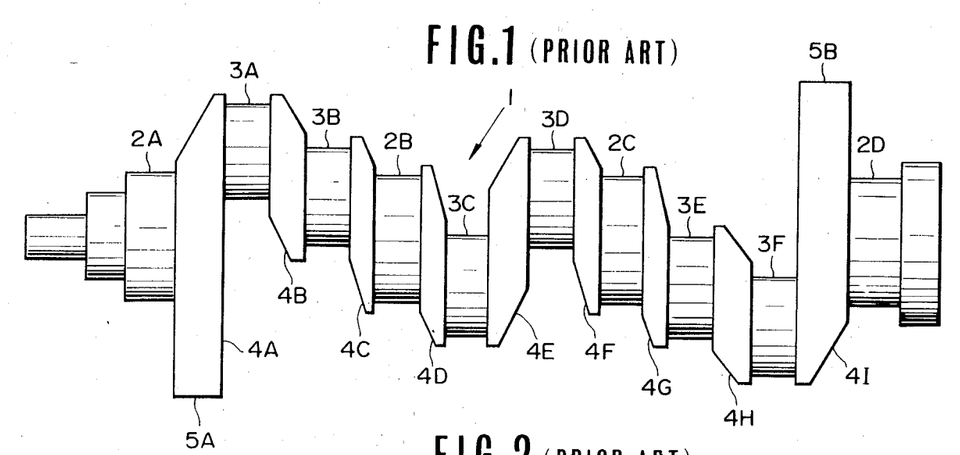
FIG. 1 is a front view of a conventional crankshaft.
Figure 2:
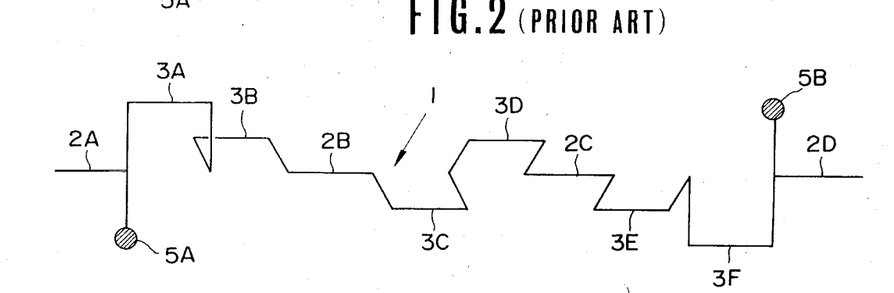
FIG. 2 is a diagrammatic illustration of the crankshaft of FIG. 1.

To facilitate understanding the present invention, a brief reference will be made to a conventional crankshaft used in a V-6 internal combustion engine, depicted in FIGS. 1 and 2. Referring to FIGS. 1 and 2, the conventional crankshaft includes first, second, third and fourth main bearing journals 2A, 2B, 2C and 2D which are aligned successively in the direction from the crankshaft front end side to the rear end side on which a flywheel is to be located. The main bearing journals are to be rotatably supported through main bearings on a cylinder block.

The crankshaft 1 further includes first, second, third, fourth, fifth, and sixth crank pins 3A, 3B, 3C, 3D, 3E and 3F which are to be connected through connecting rods with pistons of individual engine cylinders, respectively. Additionally, first, second, third, fourth, fifth, sixth, seventh, eight, and ninth crank arms 4A, 4B, 4C, 4D, 4E, 4F, 4G, 4H, 4I are provided to connect adjacent ones of the main bearing journals and the crank pins.

As shown, the two crankpins (3A and 3B, 3C and 3D, and 3E and 3F) are disposed between the adjacent two main bearing journals, in which the two crank pins are spaced 60 degrees apart in the circumferential direction around the center axis of the crankshaft. Additionally, the first to sixth crank pins 3A–3F are spaced 60 degrees apart from the adjacent one in the circumferential direction and located in the order of the first, second, fifth, sixth, third, and fourth pins, so that the angle of the two cylinder banks (not shown) of the V-6 engine relative to each other is 60 degrees. The reference numerals 5A, 5B denote first and second balance weights which are installed to the crank arms 4A, 4I, respectively. These balance weights 5A, 5B are located on the opposite side of the crankshaft center axis from the first and sixth crank pins 3A, 3F, respectively, so as to balance primary unbalanced couple during the rotation of the crankshaft 1.

However, with such a conventional crankshaft provided with the balance weights located only at the opposite end sections of the crankshaft, dynamic balance in the crankshaft as a whole can be established, bent no balance can be established between the adjacent main bearing journals. As a result, the bearing load applied to the respective main bearing journals, particularly the second and third main bearing journals, becomes greater, thereby causing wear and seizure of bearings and noise generation due to eccentric wear or the like of the bearing.

Figure 3:
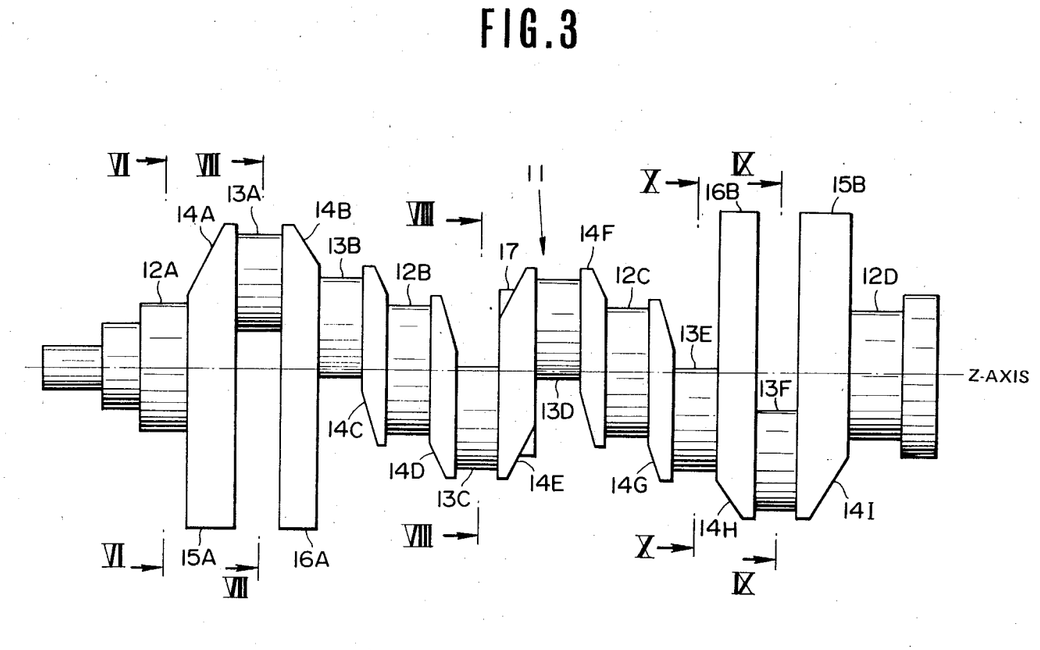
FIG. 3 is a front view of an embodiment of the crankshaft according to the present invention.
Figure 4:
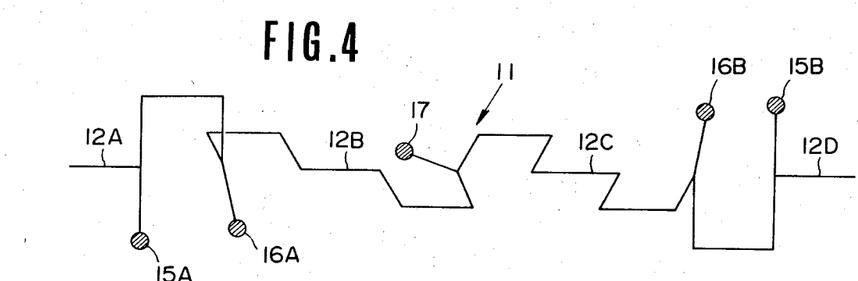
FIG. 4 is a diagrammatic illustration of the crankshaft of FIG. 3.

In view of the above description of a conventional crankshaft configuration, reference is now made to FIGS. 3 to 12, and more specifically to FIG. 3, wherein an embodiment of the crankshaft of the present invention is illustrated by the reference numeral 11. The crankshaft 11 is of a V-6 internal combustion engine having two cylinder banks whose angle (bank angle δ) in relation to each other is 60 degrees.

Figure 5:
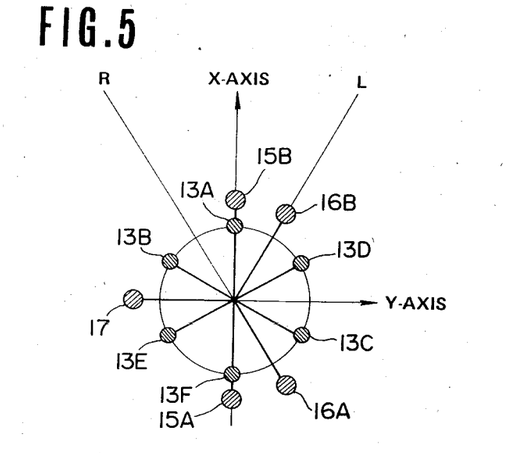
FIG. 5 is a diagrammatic illustration of FIG. 3, in a plane to which the center axis of the crankshaft is perpendicular.

The crankshaft 11 comprises first, second, third, and fourth main bearing journals 12A, 12B, 12C, 12D which are aligned successively in a direction (referred hereinafter to as an "order direction") from front end section (to be provided with a pulley) to a rear end section (to be provided with a flywheel). First and second crank pins 13A, 13B are disposed between the first and second main bearing journals 12A, 12B and located successively in the order direction. The first main bearing journal 12A and the first crank pin 13A are integrally connected with each other by a first crank arm 14A. The first and second crank pins 13A, 13B are integrally connected with each other by a second crank arm 14B. The second crank pin 13B and the second main bearing journal 12B are integrally connected with each other by a third crank arm 14C. The first and second crank pins 13A, 13B are spaced 60 degrees around the rotation center axis (referred hereinafter to as a "Z-axis") of the crankshaft 11 in a plane (referred hereinafter to as "XY-plane") to which the Z-axis is perpendicular as shown in FIG. 5. In the XY-plane, the bisector of the angle formed by the center lines R and L of the two cylinder banks is referred to as a "X-axis" to which a "Y-axis" is perpendicular. It will be understood that the center line R, L of each cylinder bank corresponds to the center axis of the cylinder of the cylinder bank in the XY-plane.

Figure 6:
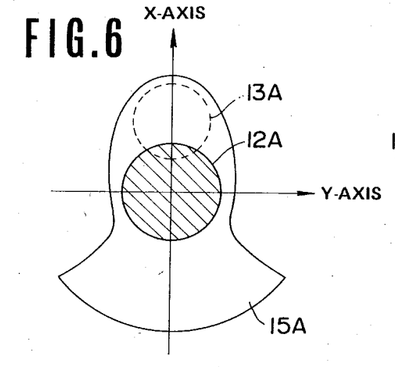
FIGS. 6, 7, 8, 9 and 10 are views taken in the direction of arrows substantially along the lines VI—VI, VII—VII, VIII—VIII, IX—IX, and X—X, respectively.
Figure 7:
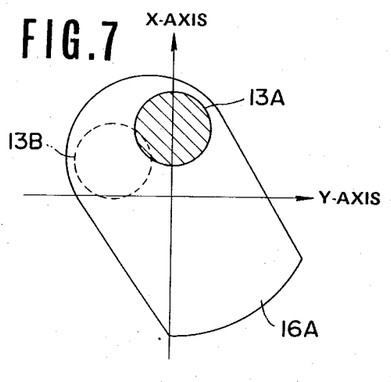

The first crank arm 14A is formed integrally with a first end balance weight 15A which is located on the opposite side of the Z-axis from the first crank pin 13A in the XY-plane as shown in FIG. 6. The second crank arm 14B is integrally formed with a first middle balance weight 16A which is located generally on the opposite side of the Z-axis from the first and second crank pins 13A, 13B in the XY plane as shown in FIG. 7. More specifically, the center axis (not shown) of the first middle balance weight 16A lies on the extension (not shown) of the bisector of the angle formed by a line (not shown) connecting the center axis of the first crank pin 13A with the Z-axis and a line (not shown) connecting the center axis of the second crank pin 13B with the Z-axis, and located on the opposite side of the Z-axis from the above-mentioned bisector also as seen from FIG. 5.

Third and fourth crank pins 13C, 13D are disposed between the second and third main bearing journals 12B, 12C and are aligned successively in the order direction. The second main bearing journal 12B and the third crank pin 13C are integrally connected with each other by a fourth crank arm 14D. The third crank pin 13C and the fourth crank pin 13D are integrally connected with each other by a fifth crank arm 14E. The fourth crank pin 13D and the third main bearing journal 12C are integrally connected with each other by a sixth crank arm 14F. The adjacent third and fourth crank pins 13C, 13D are spaced 60 degrees apart in the XY plane similarly to the relation of the first and second crank pins 13A. 13B.

Figure 8:
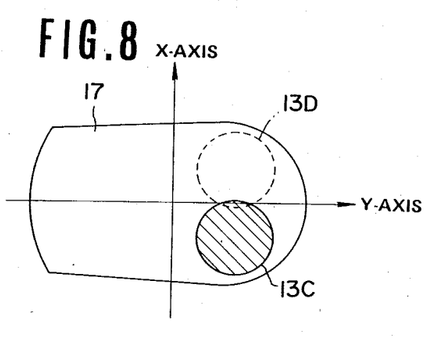

The fifth crank arm 14E is integrally formed with a central balance weight 17 which is located generally on the opposite side of the Z-axis from the third and fourth crank pins 13C, 13D in the XY-plane as shown in FIG. 8. More specifically, the center axis (not shown) of the central balance weight 17 lies on the extension (not shown) of the bisector of the angle formed by a line (not shown) connecting the center axis of the third crank pin 13C with the Z-axis and a line (not shown) connecting the center axis of the fourth crank pin 13D with the Z-axis, and located on the opposite side of the Z-axis from the above-mentioned bisector also as seen from FIG. 5.

Fifth and sixth crank pins 13E, 13F are disposed between the third and fourth main bearing journals 12C, 12D and aligned successively in the order direction. The third main bearing journal 12C and the fifth crank pin 13E are integrally connected with each other by a seventh crank arm 14G. The fifth and sixth crank pins 13E, 13F are integrally connected with each other by an eighth crank arm 14H. The sixth crank pin 13F and the fourth main bearing journal 12D are integrally connected with each other by a ninth crank arm 14I. The fifth and sixth crank pins 13E, 13F are spaced 60 degrees apart from each other with respect to the Z-axis in the XY plane.

Figure 10:
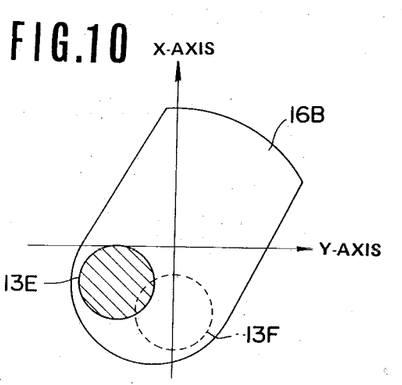

The eighth crank arm 14H is integrally formed with a second middle balance weight 16B which is located generally on the opposite side of the Z-axis from the fifth and sixth crank pins 13E, 13F as shown in FIG. 10. More specifically, the center axis (not shown) of the second middle balance weight 16B lies on the extension (not shown) of the bisector of the angle formed by a line (not shown) connecting the center axis of the fifth crank pins 13E with the Z-axis and a line (not shown) connecting the center of the sixth crank pin 13F with the Z-axis, and located on the opposite side of the Z-axis from the above-mentioned bisector.

Figure 9:
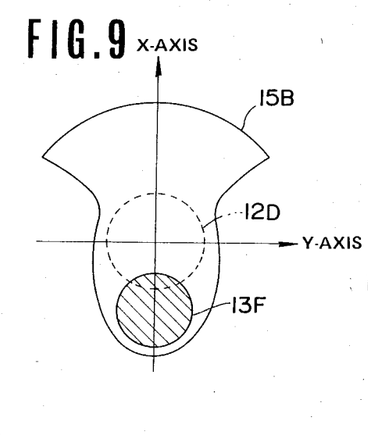

The ninth crank arm 14I is integrally formed with a second end balance weight 15B whose shape is the same as the first end balance weight 15A, and is located on the opposite side of the Z-axis from the sixth crank pin 13F as shown in FIG. 9.

Each of the main bearing journals 12A–12D is rotatably supported through a bearing metal by a cylinder block, though not shown. Each of the crank pins 13A–13F is connected through a connecting rod with a piston movably disposed in an engine cylinder formed in the cylinder bank, though not shown. As viewed in FIG. 5, the crank pins 13A–13F are in such a locational relationship in the XY-plane that they are arranged in the counterclockwise direction in the order of the first, second, fifth, sixth, third, and fourth crank pins 13A, 13B, 13E, 13F, 13C and 13D spaced apart an equal interval or angle of 60 degrees; the first and second end balance weights 15A, 15B are located symmetrical with respect to the Z-axis so as to be spaced 180 degrees apart around the Z-axis; and the first and second middle balance weights 16A, 16B and the central balance weight 17 are arranged to be spaced apart an equal interval or angle of 120 degrees. It will be understood that the first to ninth crank arms 14A–14I are arranged to be perpendicular to the Z-axis.

It is to be noted that the first to sixth crank pins 13A–13F are equal in mass and length (distance) between their center of mass and the Z-axis. Additionally, the first and second end balance weights 15A, 15B are equal in mass, and the first and second middle balance weights 16A, 16B are equal in mass. It is further noted that the mass of the first and second end balance weights 15A, 15B are reduced as compared with those (for example, the weights 5A, 5B in FIG. 1) of conventional crankshafts.

Figure 11:
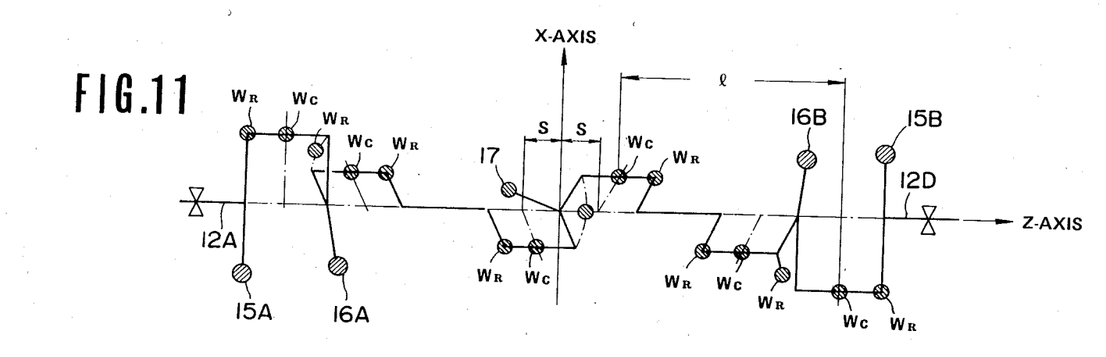
FIG. 11 is a diagrammatic illustration similar to FIG. 4, for the purpose of showing the operation of the crankshaft of FIG. 3.
Figure 12:
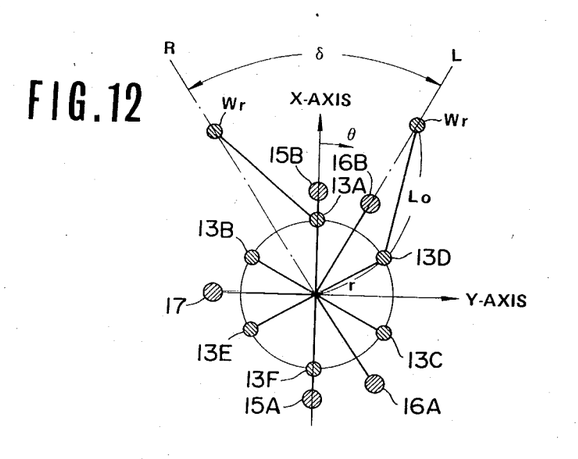
FIG. 12 is a diagrammatic illustration similar to FIG. 5, for the purpose of showing the operation of the crankshaft of FIG. 3.

The advantageous effect of the crankshaft configuration shown in FIGS. 3 to 12 will be discussed hereinafter with reference to FIGS. 11 and 12.

The unbalanced couple of forces applied to the crankshaft 11 in the V-6 engine having the bank angle $\delta$ of 60 degrees is represented by the following equation (1):

$$M = 3\left\{ r(Wc + \tfrac{1}{2}Wr) + \left(1 + \frac{1}{\sqrt{3}}\right) W_R \right\} \cdot l \cdot \omega^2 \cdot e^{i\theta} \quad (1)$$

where Wc is the total weight of the crank pin and the big end of the connecting rod; Wr is the weight of reciprocating parts (i.e., the weight of the small end of the connecting rod and the piston); $W_R$ is the product of the weight (W) of each crank arm and the radius (R) of gyration of the crank arm at the center of gravity; r is the radius of rotation (around the Z-axis) of the crank pin at the center axis; $\omega$ is the angle of rotation; and l is the pitch of cylinder bores.

Accordingly, the bearing load applied to the crankshaft 11 can be determined by using the theorem of three moments. A discussion will be made hereinafter only for determining the bearing load applied to the second main bearing journal 12B to which a greater bearing load is applied. It will be understood that the bearing load applied to the other main bearing journals can be similarly determined.

The bearing load $F_2$ applied to the second main bearing journal 12B is represented by the following equation (2):

$$\vec{F_2} = \vec{F_A} + \vec{F_P} + \vec{F_C} \quad (2)$$

where $F_A$ is the load due to gyrating mass except the balance weights, and reciprocating mass; $\vec{Fp}$ is the load due to gas pressure within the engine cylinder; and $\vec{Fc}$ is the load due to the balance weights.

(a) This $\vec{F_A}$ is made up of a X-axis direction component $F_{AX}$ and a Y-axis direction component $F_{AY}$ which are represented by equations (3) and (4), respectively. In this connection, crankangle $\theta$ is assumed to be a standard 0 degree when the first crank pin 13A is located on the X-axis, so that the crankangle $\theta$ increases (with a positive value) in the clockwise direction in FIG. 12. The equations (3) and (4) are expressed for the load at the crankangle $\theta$.

$$g \cdot F_A x/\omega^2 = f_1 \cdot W_R \cdot \cos\theta + \quad (3)$$
$$f_2(Wc \cdot r \cdot \cos\theta - Wr \cdot r\{\cos(\theta - \pi/2) + 1/\lambda \cdot \cos(2\theta + \delta)\}$$
$$\cos\delta/2) + f_3 \cdot W_R \cdot \cos(\theta - \delta/2) + \ldots +$$
$$f_{15} \cdot W_R \cdot \cos(\theta + 180°)$$

$$g \cdot F_{AY}/\omega^2 = f_1 \cdot W_R \cdot \sin\theta + \quad (4)$$
$$f_2(Wc \cdot r \cdot \sin\theta - Wr \cdot r\{\cos(\theta + \delta/2) + 1/\lambda \cdot \cos(2\theta + \delta)\}$$
$$\sin - \delta/2) + f_3 \cdot W_R \cdot \sin(\theta - \delta/2) + \ldots +$$
$$f_{15} \cdot W_R \cdot \sin(\theta + 180°)$$

where $f_1 \cdot f_2 \ldots f_{15}$ are coefficients determined by the theorem of three moments; $\lambda$ is the ratio between the length Lo of the connecting rod and the radius r of rotation (around the Z-axis) of the crank pin; and g is gravitational acceleration. (b) $\vec{Fp}$ is made up of a X-axis direction component $Fp_X$ and a Y-axis direction component $Fp_Y$ which are represented by equations (5) and (6), respectively.

$$Fp_X / \left(\frac{\pi}{4} D^2\right) = -f_2 \cdot P(\theta + \delta/2) \cdot \quad (5)$$
$$\cos\delta/2 - f_4 \cdot P(\theta + \delta/2 - 120°) \cdot \cos\delta/2 - f_7 \cdot$$
$$P(\theta + \delta/2 - 240°) \cdot \cos\delta/2 - \ldots - f_{14} \cdot$$
$$P(\theta + \delta/2 - 600°) \cdot \cos\delta/2$$

$$Fp_Y / \left(\frac{\pi}{4} D^2\right) = -f_2 \cdot P(\theta + \delta/2) \cdot \quad (6)$$
$$\sin\delta/2 - f_4 \cdot P(\theta + \delta/2 - 120°) \cdot \sin\delta/2 + f_7 \cdot$$
$$P(\theta + \delta/2 - 240°) \cdot \sin\delta/2 + \ldots - f_{14} \cdot$$
$$P(\theta + \delta/2 - 600°) \cdot \sin\delta/2$$

(c) $\vec{Fc}$ is represented as the sum of values of the individual balance weights, each value being obtained by multiplying a generated vector by the coefficient (See equation (7)).

$$\vec{Fc} = f_1 \cdot \vec{W}_{R15A} + f_3 \cdot \vec{W}_{R16A} + f_8 \cdot \vec{W}_{R17} + F_{13} \cdot \vec{W}_{R16B} + f_{15} \cdot \vec{W}_{R15B} \quad (7)$$

where the characters (15A ... 15B) attached to $W_R$ indicate the balance weights 15A, 16A, 17, 16B, and 15B, respectively.

Additionally, the following equation (8) is satisfied in case only the end balance weights are used as in the conventional crankshaft;

$$W_{R16A} = W_{R17} = W_{R16B} = O \quad (8)$$

As a result of the above-discussed items (a), (b) and (c), the bearing load at predetermined crankangles can be determined.

Figure 13:
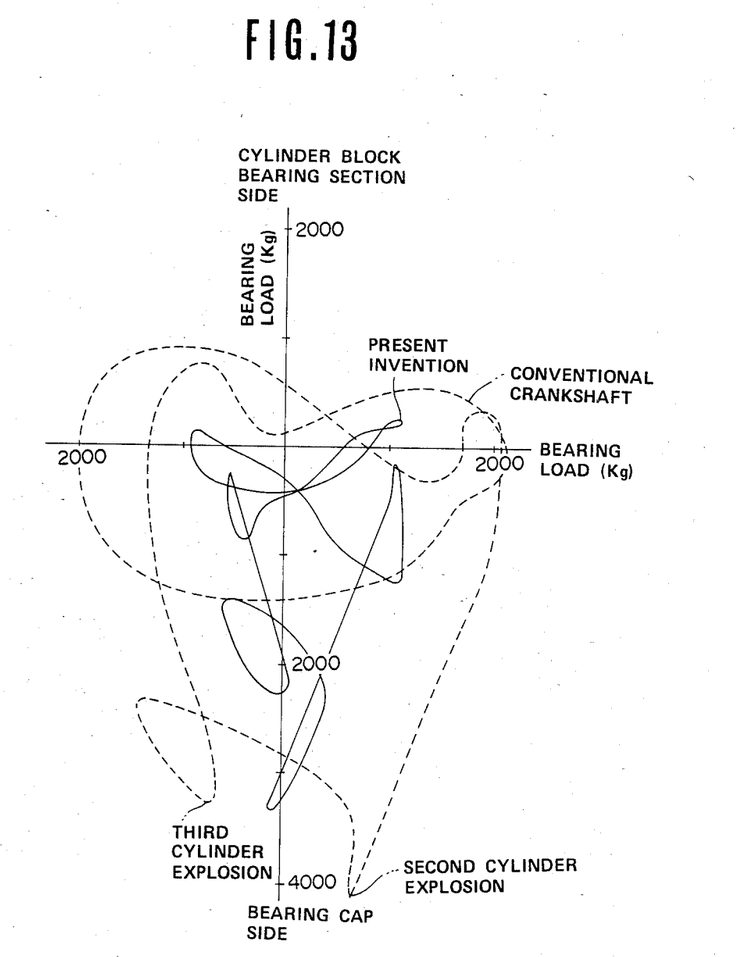
FIG. 13 is a graph showing the magnitude and direction of bearing load.

FIG. 13 shows the magnitude and the direction of the bearing load applied during two rotations (=0—720 degrees) of the crankshaft 11. In the drawing, a solid line indicates the bearing load in the embodiment (shown in FIGS. 3 to 12) according to the present invention, while a broken line indicates the bearing load in the conventional crankshaft shown in FIGS. 1 and 2. As seen from FIG. 13, the maximum load in the embodiment of the present invention reduces about 20% as compared with in the conventional crankshaft. Furthermore, the direction of the load in the embodiment of the present invention is considerably different from in the conventional crankshaft. It will be appreciated that the bearing load applied to the second and third main bearing journals 12B, 12C can be further reduced by increasing the mass of the medium and central balance weights 16A, 16B, 17 and by decreasing the mass of the end balance weights 15A, 15B.

Figure 14:
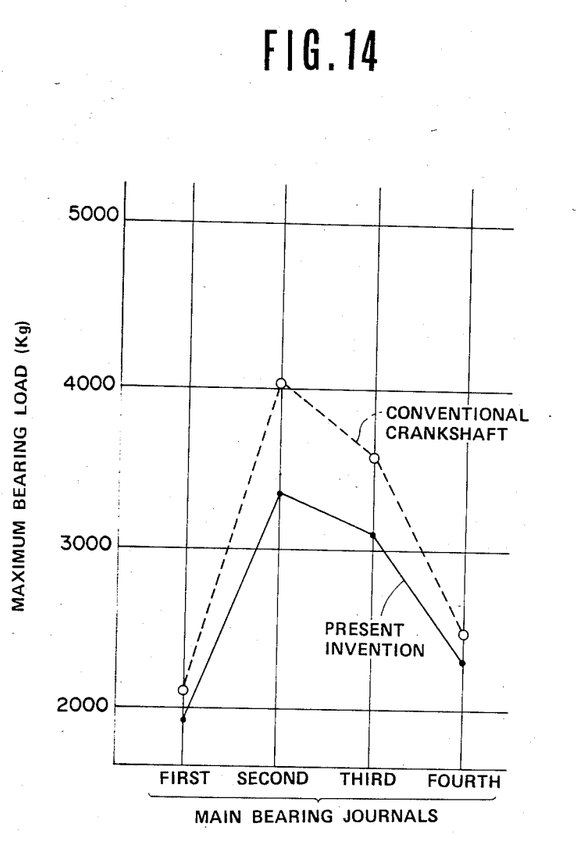
FIG. 14 a graph showing the distribution of bearing load at the main bearing journals of the crankshaft.

FIG. 14 shows the bearing load distribution indicating the maximum loads applied to the first to fourth main bearing journals 12A–12D. Also in this figure, a solid line indicates the maximum load in the embodiment of the present invention, while a broken line indicates the maximum load in the conventional crankshaft. As seen from this figure, the bearing load is reduced throughout all the main bearing journals in the embodiment of the present invention as compared with in the conventional crankshaft. It is to be noted that the bearing load reduction at the second and third main bearing journals 12B, 12C is obtained as a result of the first and second middle balance weights 16A, 16B and the central balance weight 17, whereas the bearing load reduction at the first and fourth main bearing journals 12A, 12D is obtained as a result of the mass reduction of the first and second end balance weights 15A, 15B.

Figure 15:
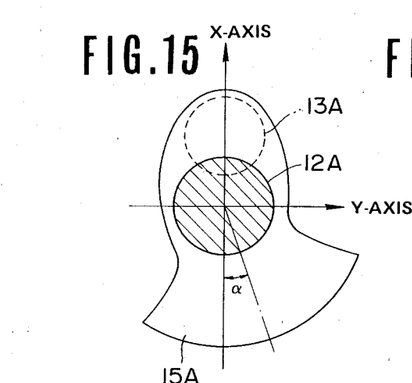
FIGS. 15, 16, 17, 18 and 19 are views similar to FIGS. 6, 7, 8, 9 and 10, but showing another embodiment of the crankshaft according to the present invention.
Figure 16:
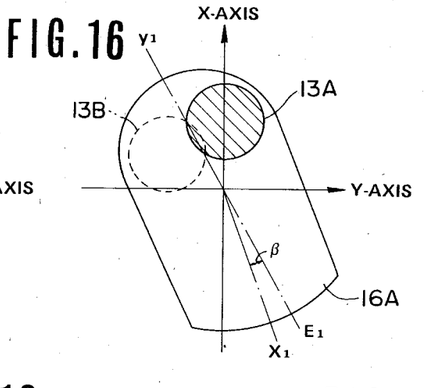
Figure 17:
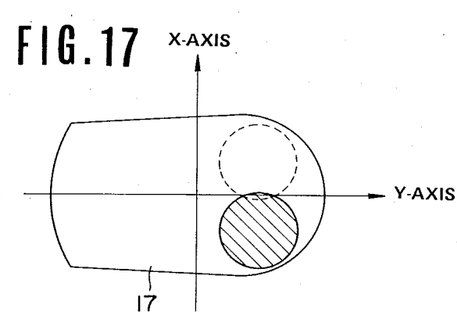
Figure 18:
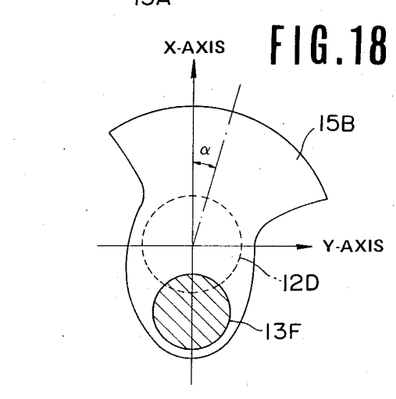
Figure 19:
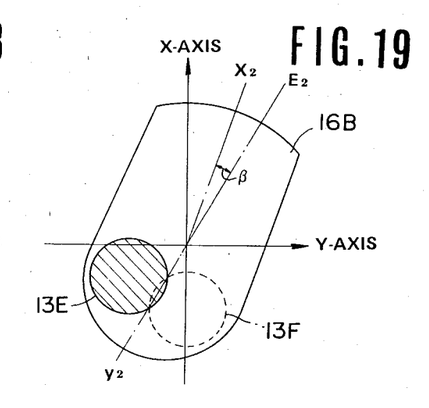

FIGS. 15 to 20 illustrate another embodiment of the crankshaft in accordance with the present invention. In this embodiment, the center axis $x_1$ of the first middle balance weight 16A is offset an offset angle $\beta$ from the extension $E_1$ of a line $y_1$ that connects the midpoint of the center axes of the crank pins 13A, 13B with the Z-axis in the XY-plane as shown in FIG. 16. The line $y_1$ corresponds to the bisector of the angle formed by the line (not shown) connecting the center axis of the crank pin 13A with the Z-axis and the line (not shown) connecting the center axis of the crank pin 13B with the Z-axis in the XY-plane. Additionally, the center line $x_2$ of the second middle balance weight 16B is similarly offset the offset angle $\beta$ from the extension $E_2$ of a line $y_2$ that connects the midpoint of the center axes of the crank pins 13E, 13F with the Z-axis in the XY-plane as shown in FIG. 19. The line $y_2$ corresponds to the bisector of the angle formed by the line (not shown) connecting the center axis of the crank pin 13E with the Z-axis and the line (not shown) connecting the center axis of the crank pin 13F with the Z-axis in the XY-plane.

Furthermore, in order to balance the unbalance caused by these offset configurations, the center axis of the first and second end balance weights 15A, 15B is offset an offset angle $\alpha$ from the X-axis in the XY-plane in the opposite direction of the offset in the middle balance weights 16A, 16B (i.e., in the counterclockwise direction in the XY-plane) as shown in FIGS. 15 and 18. As illustrated in FIG. 17, no offset configuration is applied to the central balance weight 17. The above-mentioned offset configuration of the first and second middle balance weights 16A, 16B contributes to a further reduction of the bearing load applied to the main bearing journals. It will be understood that the bearing load in this embodiment can be determined by shifting the direction of the vector by the offset angle in the above-mentioned equation (7).

Figure 20:
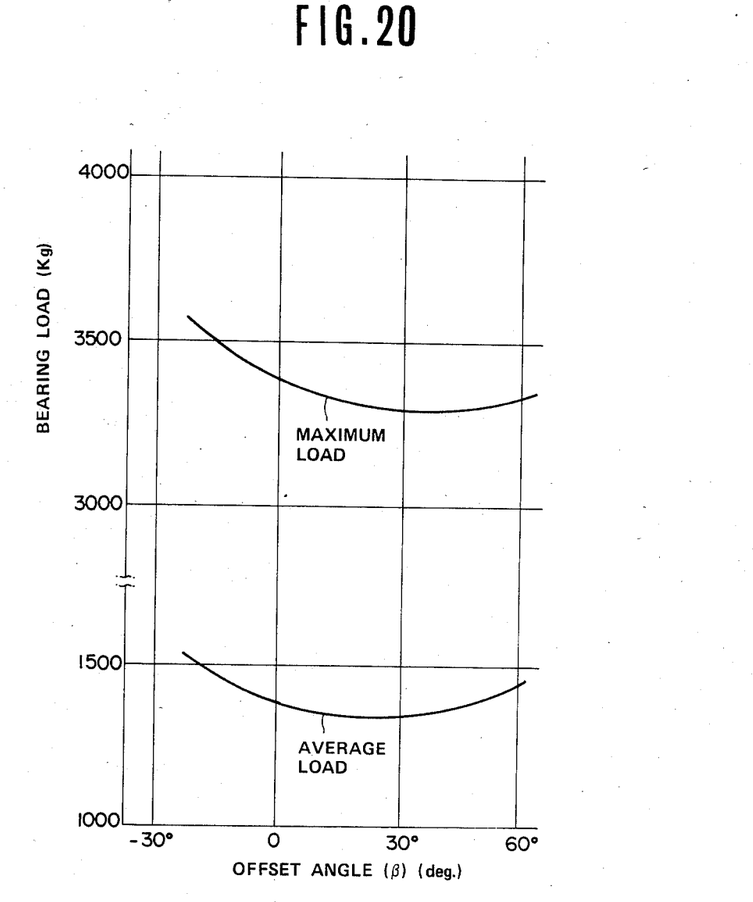
FIG. 20 is a graph showing the relationship between the offset angle of a counter weight and the bearing load applied to a main bearing journal of the crankshaft of FIGS. 15 to 19.

FIG. 20 shows the variation of the bearing load applied to the second main bearing journal 12B when the offset angle $\beta$ of the first middle balance weight 16A is varied. In this figure, the offset angle $\beta$ is indicated to be positive in the clockwise direction in FIG. 16 on the assumption of the extension $E_1$ of the line $y_1$ being a standard. The first and second middle balance weights 16A, 16B are located symmetrical with respect to the Y-axis. Similarly, the first and second end balance weights 15A, 15B are located symmetrical with respect to the Y-axis. FIG. 20 reveals that the bearing load reduces with the increased offset angle $\beta$ until the offset angle reaches to a predetermined level, but again increases over the predetermined level.

As will be appreciated above, according to the present invention, a great reduction in the bearing load applied to the crankshaft main bearing journals can be effectively achieved, thereby preventing wear and seizure of the main bearings and noise generation therefrom.

What is claimed is:

1. A crankshaft of a V-6 internal combustion engine comprising:

first, second, third and fourth main bearing journals disposed successively in a direction from a first end section to a second end section of said crankshaft;

first and second crank pins disposed successively in said direction between said first and second main bearing journals;

third and fourth crank pins disposed successively in said direction between said second and third main bearing journals;

fifth and sixth crank pins disposed successively in said direction between said third and fourth main bearing journals;

first, second, third, fourth, fifth, sixth, seventh, eighth, and ninth crank arms disposed successively in said direction to connect adjacent ones of said main bearing journals and crank pins;

first and second end balance weights connected to said first and ninth crank arms, respectively, the first crank arm connecting said first main bearing journal and said first crank pin, said ninth crank arm connecting said sixth crank pin and said fourth main bearing journal, said first and second end balance weights being located on the opposite side of center axis of said crankshaft from said first and sixth crank pins, respectively;

a first middle balance weight connected to said second crank arm and located on the opposite side of the crankshaft center axis from said first and second crank pins, said second crank arm connecting said first and second crank pins, said first middle balance weight having a center axis offset a first predetermined angle from an extension of a first bisector of an angle formed by a first line which connects center axis of said first crank pin with the crankshaft center axis and a second line which connects center axis of said second crank pin with the crankshaft center axis in a plane to which the crankshaft center axis is perpendicular;

a central balance weight connected to said fifth arm and located on the opposite side of the crankshaft center axis from said third and fourth crank pins, said fifth crank arm connecting said third and fourth crank pins;

a second middle balance weight connected to said eighth crank arm and located on the opposite side of the crankshaft center axis from said forth and sixth crank pins, said eighth crank arm connecting said fifth and sixth crank pins, said second middle balance weight having a center axis offset said first preterminded angle from an extension of a second bisector of an angle formed by a third line which connects center axis of said fifth crank pin with the crankshaft center axis and a fourth line which connects center axis of said sixth crank pin with the crankshaft center axis in said plane;

said offset of said first predetermined angle of said first and second middle balance weights causing an unbalance of the crankshaft;

said first end balance weight having a center axis offset a second predetermined angle from an extension of a line which connects center axis of said first crank pin and the crankshaft center axis in said plane, said second end balance weight having a center axis thereof offset said second predetermined angle from an extension of a line which connects center axis of said sixth crank pin and the crankshaft center axis in said plane;

said offset of said first and second end balance weights balancing said unbalance of the crankshaft caused by said offset of said first and second middle balance weights.

2. A crankshaft as claimed in claim 1 wherein said center axis of said first and second middle balance weights is offset in clockwise direction in said plane.

3. A crankshaft as claimed in claim 2 wherein said center axis of said first and second end weight balances is offset in counterclockwise direction in said plane.

* * * * *